Figure 1:
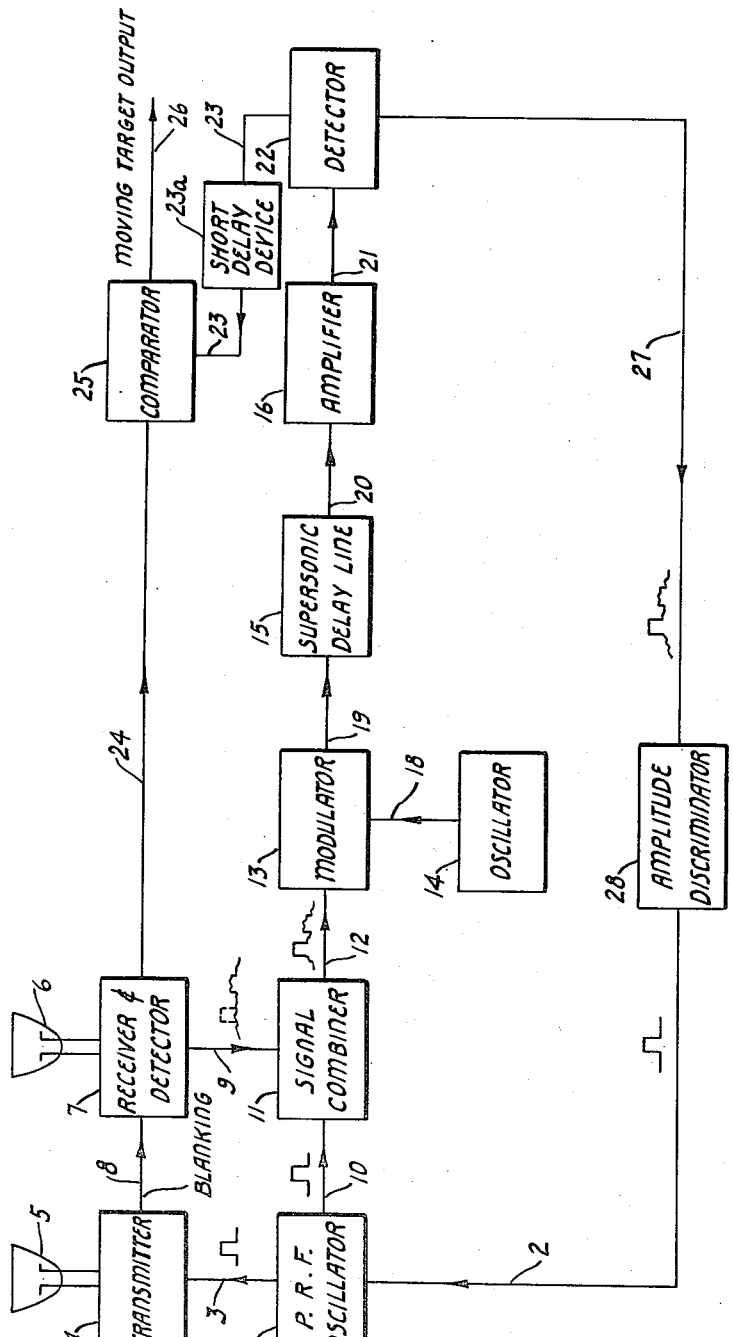

Aug. 25, 1953

A. C. MUNSTER 2,650,357

DELAY CONTROLLED PULSE GENERATOR

Filed Nov. 13, 1947

2 Sheets-Sheet 2

INVENTOR.
ALLEN C. MUNSTER

BY

AGENT

UNITED STATES PATENT OFFICE 2,650,357

DELAY CONTROLLED PULSE GENERATOR

Allen C. Munster, Philadelphia, Pa., assignor to Philco Corporation, Philadelphia, Pa., a corporation of Pennsylvania Application November 13, 1947, Serial No. 785,645

4 Claims. (Cl. 343—7.7)

The invention herein described and claimed relates to a method of and means for generating accurately timed electrical impulses. Although the invention is of general applicability, it is particularly adapted for use in pulse type radar (radio detection and ranging) systems, and, especially in such systems which are utilized to indicate the presence and position of target objects which are in motion.

In pulse type radar systems it is customary to transmit from a predetermined location, which may be either fixed or mobile, time-spaced impulses of high frequency energy which are directed by suitable means to cause them to impinge upon and to be reflected from target objects, the positions of which it is desired to determine. The reflections of such impulses from the objects, when received by suitable equipment and supplied to suitable indicating means, provide information with regard to the relative positions of the objects from which the reflections are produced. Such systems customarily employ a pulse repetition frequency oscillator, of one form or another, which generates time-spaced pulse signals—usually periodically recurrent—which are used to control the transmission of successive impulses of high frequency energy.

In radar systems intended to indicate exclusively or primarily the position of target objects which are in motion, it is customary to compare the reflections from the same objects produced by successive transmitted impulses. If certain conditions are satisfied, which it is not necessary here to discuss in detail, successive reflections from fixed targets will be of essentially the same amplitude. On the other hand, successive reflections from targets which move will differ in amplitude owing to Doppler shift produced by their motion, and by reason of the fact that, for example, the reflections actually consist of the resultant of the combination of reflections from moving targets with reflections from surrounding landmass. This provides a basis for discriminating between fixed and moving targets, and it is known to provide means whereby successive reflections having the same amplitudes are cancelled out, while those having different amplitudes, because of the above mentioned phenomenon, are not, and, when supplied to a suitable indicator provide indications only of those targets which are in motion.

According to one general method for achieving this objective, reflections produced in response to a given transmitted impulse, upon reception, are delayed by a time interval equal to that between the transmission of successive high frequency impulses and are then compared with reflections produced in response to the next succeeding transmitted impulse. In this manner, reflections produced by successive transmitted pulses are caused to coincide in time. Thus, the delayed and undelayed reflections may be subtracted one from the other in suitable circuits intended for this purpose, and, owing to the difference in amplitude between successive reflections from moving targets only, the resultant signal will contain solely or primarily indications corresponding to targets which are in motion. In order that the cancellation of the reflections produced by fixed targets may be complete or substantially so, the intervals between successive transmitted impulses must be made almost exactly the same as the intervals by which the received reflections are delayed. In the past, considerable difficulty has been experienced in securing and maintaining this relationship.

Accordingly, it is the principal object of the present invention to provide a method and means, particularly adapted for use in radar moving target indicating systems of the sort above referred to, for accurately and precisely controlling the transmission of time-spaced impulses of high frequency energy with reference to the delay time of means utilized at the receiver to delay the reflections produced by such transmitted impulses from target objects.

Another object of the invention is to provide a method of and means for generating accurately timed periodically recurrent electrical impulses.

A further object of the invention is to provide a generator for producing electrical impulses in response to trigger pulses supplied thereto, said generator having a reduced susceptibility to respond to trigger pulses during a predetermined interval following the time when it is triggered.

Briefly, the principal object of the invention is achieved in the following manner: Successive impulses generated by the pulse repetition frequency oscillator in a radar moving target indicating system are delayed by the same means which is utilized to delay received reflections of transmitted high frequency impulses. The pulses thus delayed are separated by suitable means from the delayed reflections and are then utilized to trigger the pulse repetition frequency oscillator. In this manner the intervals between successive pulses generated by the pulse repetition frequency oscillator are made precisely equal to the interval by which the received reflections are delayed. The details of the method and of apparatus by which this result may be achieved in accordance with the invention will be fully understood from consideration of the following detailed description and the accompanying drawings in which Fig. 1 illustrates a typical embodiment of the invention applied to a radar moving target indicating system, and Fig. 2 illustrates schematically a suitable pulse repetition frequency oscillator according to the invention.

Figure 2:
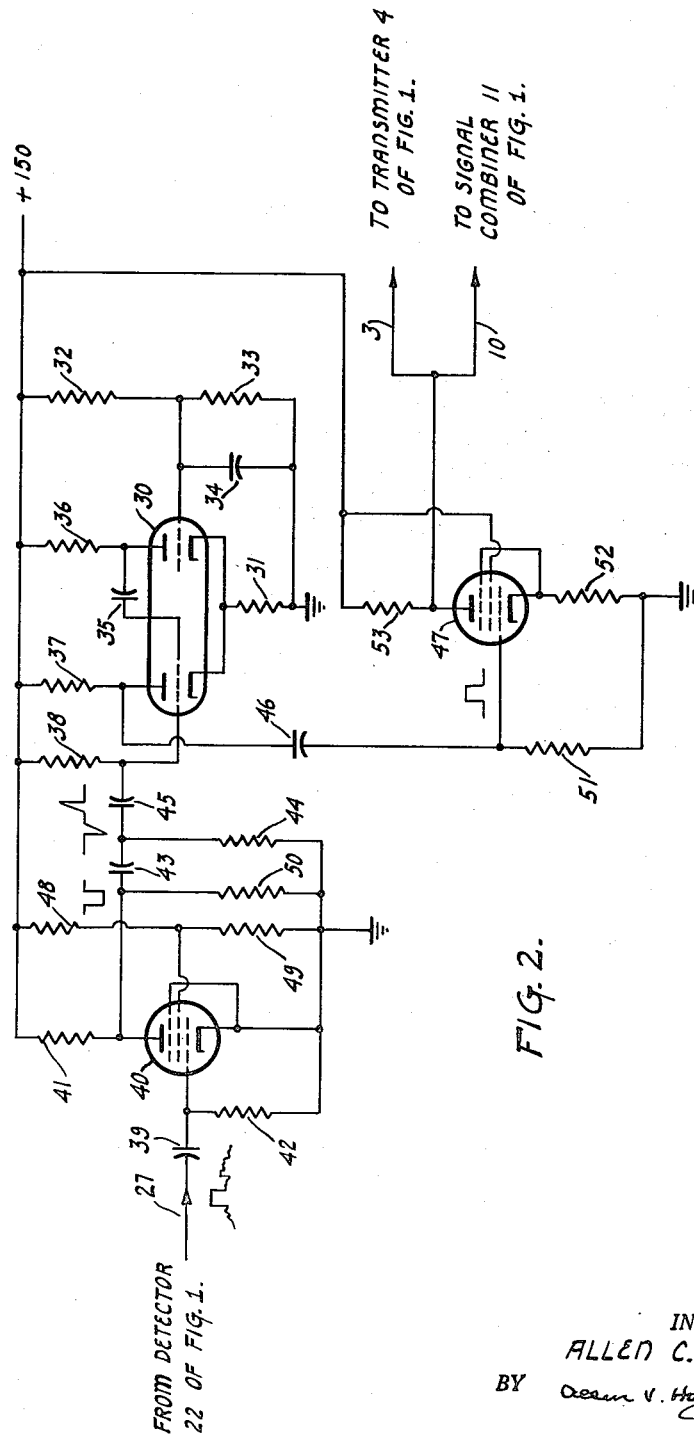

Referring now to Fig. 1, P. R. F. (pulse repetition frequency) oscillator 1 is an oscillator, having characteristics hereinafter to be specified, which is adapted to generate pulse signals in response to trigger pulses supplied thereto through connection 2. The pulses generated by the P. R. F. oscillator are supplied through connection 3 to transmitter 4 and control the production thereby of successive pulses of energy in the super-high frequency or microwave range, which are radiated by means of a suitable transmitting antenna 5. The latter may be orientable in the usual manner to cause it to radiate pulses in various directions so as to impinge upon different target objects located in a predetermined region in space. Reflections of the impulses thus transmitted are intercepted by a suitable receiving antenna 6 which may be similarly orientable, preferably in synchronism with transmitting antenna 5. If desired, of course, a single transmitting and receiving antenna may be used, in which case there will be provided a suitable duplexer or T-R device, in accordance with conventional radar practice, connecting the transmitter and receiver to the common antenna and adapted to exclude transmitter energy from the receiver.

The reflected impulses intercepted by antenna 6 are supplied to a conventional receiver and detector 7. As is customary, receiver 7 may be controlled through a connection 8 from transmitter 4 so as to render it inoperative to receive signals during the intervals in which impulses are transmitted by antenna 5. Received detected signals from receiver and detector 7, and pulses from P. R. F. oscillator 1, are supplied respectively through connections 9 and 10 to a suitable signal combiner 11 in which the P. R. F. pulses are superimposed on the detected received signals. The output from signal combiner 11 is supplied through connection 12 to a suitable delay means which may comprise modulator 13, oscillator 14, supersonic delay line 15, amplifier 16, and detector 22. Supersonic delay line 15 comprises, for example, a column of mercury or other suitable medium confined in a pipe. Opposite ends of the column are provided with suitable transducers (e. g., crystals). One of these transducers is adapted to be driven by an input signal to propagate supersonic waves in the mercury or other medium, and the other transducer is adapted to pick up such waves and reconvert them into electrical signals which are delayed in time with reference to the input signals by the time required for the waves to travel from one end of the column to the other. Such arrangements are well-known in the prior art for providing relatively long time delays of electrical signals. For such a device to operate efficiently, it is necessary that the input signals supplied thereto comprise frequency components within a particular range. If the frequency components of the signals to be delayed do not lie within this range, it is customary to mix them first with a signal having a carrier frequency within that range. Accordingly, the output from signal combiner 11 is supplied through connection 12 to modulator 13, which, in response thereto, is adapted to modulate a carrier within the desired range supplied to modulator 13 through connection 18 from oscillator 14. The modulated signal thus produced is supplied through connection 19 to the input of supersonic delay line 15. The delayed output from the supersonic delay line is supplied through connection 20 to amplifier 16 which is included for the purpose of restoring, to a suitable level, the signal which will have undergone attenuation in the course of passage through supersonic delay means 15. The output of amplifier 16 is supplied through connection 21 to detector 22 which converts it to the form of signal existing in the output from signal combiner 11.

As in one usual form of radar moving target indicator, delayed signals from detector 22 and undelayed signals from receiver and detector 7 are supplied respectively through connections 23 and 24 to a suitable signal comparator 25 which, as aforementioned, may be adapted to subtract one signal from the other and to yield a resultant signal comprising only or primarily signals indicative of the presence of moving targets. For reasons presently to be mentioned, connection 23 may include means 23a for producing a relatively short delay (e. g. ½ microsecond) of the signal supplied to comparator 25. The resultant signal, derived from the output of comparator 25, may be supplied through connection 26 to any suitable form of indicator or other apparatus adapted to utilize the moving target output. In accordance with the invention the output from detector 22 is also supplied through connection 27 to a suitable amplitude discriminator 28 which is adapted to separate the delayed P. R. F. oscillator pulses from the delayed video signal present in the output of detector 22. From the output of amplitude discriminator 28, the delayed P. R. F. pulses are supplied as trigger pulses through connection 2 to P. R. F. oscillator 1, which is adapted to respond thereto to generate the pulses which control transmitter 4. The time required for P. R. F. oscillator 1 to respond to triggering will generally introduce a small increase in the spacing between pulses generated by it. This is compensated by the delay introduced in connection 23, as aforementioned, which should be made equal to the lag in triggering.

In order that amplitude discriminator 28 may operate to perform the separation above referred to, it is essential that the pulses generated by P. R. F. oscillator 1, and supplied therefrom through connection 10 to signal combiner 11, exceed in amplitude the received detected signals supplied to signal combiner 11 through connection 9. Obviously, this condition can readily be satisfied by utilizing a P. R. F. oscillator having a suitably large output, or by amplifying the output therefrom.

Although it will generally be desirable to provide distinct means for supplying pulses from P. R. F. oscillator 1 to signal combiner 11 (e. g., connection 10), this may not always be necessary. For example, if the inherent delay between the generation of a pulse by P. R. F. oscillator 1 and the transmission of a corresponding pulse of high frequency energy by transmitter 4 and antenna 5 is not appreciable, then receiver and detector 7 may be permitted to operate during the intervals of pulse transmission so as to pick up high frequency pulses from transmitting antenna 5. In other words, the connection 8 from transmitter 4 to receiver 5, which is normally used to render the receiver inoperative during the transmission of pulses, may be omitted. Under these circumstances there will automatically be included, in the output from receiver and detector 7, pulses of substantial amplitude coinciding in time with the P. R. F. oscillator pulses. These pulses, when delayed and separated from the video signal by the operation of the system as described, will provide suitable triggering for P. R. F. oscillator 1. However, there are difficulties involved in this procedure such that it is not to be recommended. Specifically, the transmitter will usually delay the transmission of high frequency pulses appreciably with respect to the P. R. F. oscillator pulses, and it is generally undesirable to permit the receiver to operate during the transmission of high frequency pulses, inasmuch as the subsequent operation of the receiver may be adversely affected thereby.

In general, P. R. F. oscillator 1 may be any form of conventional oscillator (e. g., a multivibrator) adapted to generate periodically recurrent pulse signals whose period of recurrence is normally greater than the delay introduced by supersonic delay line 15, but which is adapted to be triggered so as to cause it to generate pulse signals at a shorter period. Thus, for example, if the delay introduced by supersonic delay line 15 is 1250 microseconds (a typical value corresponding to a pulse repetition frequency of 800 cycles per second), the free running frequency of the pulse repetition frequency oscillator might be selected to lie anywhere between 400 and 800 cycles per second. In a typical instance, the pulse repetition frequency oscillator consisted of a multivibrator having a free running frequency of approximately 550 cycles per second and adapted to generate pulses 4 microseconds in duration.

A further requirement imposed upon the pulse repetition frequency oscillator for optimum operation according to the invention is that it should not respond to triggering during a time interval following a given triggering and of duration equal at least to half the delay provided by supersonic delay line 15 (in this instance 625 microseconds). This insures that if the P. R. F. oscillator is inadvertently triggered in response to a stray signal, its subsequent mode of operation will not continue to be affected by the single inadvertent triggering. If this requirement is not met, and if the P. R. F. oscillator is susceptible of being triggered during an interval following a given triggering and of duration equal to half the delay of the delay line, an additional set of triggering pulses will be perpetuated in the system, which will cause the P. R. F. oscillator to operate at twice the desired frequency. This will readily be appreciated by considering the case in which the oscillator is inadvertently triggered at some time following a given triggering and less than half the delay of the delay line. When such inadvertent triggering occurs, there will be present in the delay line, and at a point in the first half of the length thereof, waves produced in response to the previous triggering. At the same time there will be initiated, at the input end of the delay line, waves corresponding to the undesired triggering. Both of these groups of waves will proceed down the line and at the end thereof will be converted into triggering pulses. Both of these triggering pulses will successively trigger the P. R. F. oscillator and produce corresponding groups of waves in the supersonic delay line. This cycle will recur with a period equal to the delay of the delay line, and thus two P. R. F. oscillator pulses will continue to be produced during each interval of duration equal to the delay of the delay line. However, if the P. R. F. oscillator is constructed in such a manner that it is non-responsive following a given triggering during an interval of duration equal at least to half the delay in the delay line, this phenomenon cannot exist. In accordance with the invention a P. R. F. oscillator having these characteristics may be constructed in the manner which will now be set forth.

Referring now to Fig. 2, there is illustrated a conventional cathode coupled multivibrator comprising double triode vacuum tube 30 and associated connections. The two sections of this tube conduct alternately. The durations of the intervals during which the left-hand section conducts are primarily determined by an RC circuit comprising resistor 33 and condenser 34 connected in shunt from the grid of the right-hand section to ground. Similarly, the durations of the intervals during which the right-hand section of tube 30 conducts is primarily determined by a second RC circuit comprising resistor 38, condenser 35 and resistor 36 in series. Thus the period or frequency of oscillation of the multivibrator is determined through the cooperation of these two RC circuits. The operation of the circuit as a whole is as follows: Assuming the left-hand section of tube 30 to be conductive, and the right-hand section to be non-conductive owing to a negative component of bias potential existing across condenser 34 as a result of grid conduction of the right-hand section during its previous conductive interval, condenser 34 will gradually discharge through resistor 33 and then charge through resistor 32 until the net grid bias applied to the right-hand section is such as to permit the right-hand section to commence conducting. When this occurs, the resultant reduction in the plate potential of the right-hand section will be applied through coupling condenser 35 to the grid of the left-hand section and will cause the left-hand section to cut off. During the interval of conduction of the left-hand section there will have been developed across condenser 35 a negative potential which, in combination with the reduced bias developed across cathode resistor 31 when the left-hand section is not conducting, will be sufficient to maintain it cut off. (The average grid bias on the right-hand section when it conducts is made greater than that on the left-hand section when it conducts.) However, the potential existing across condenser 35 will gradually leak off through resistors 36 and 38 until a point is reached at which the net bias applied to the left-hand section of tube 30 is such as to permit it again to conduct. When this occurs, there will be an increase in the potential drop across cathode resistor 31 which will simultaneously cause the right-hand section of tube 30 to cut off, and, to remain cut off, as hereinbefore mentioned, until condenser 34 has had an opportunity to discharge itself through resistor 33.

The left-hand section of tube 30, when it is conducting, is susceptible of being triggered in a manner to cause it to cut off, before it normally would, in response to a negative potential impulse of sufficient magnitude applied to its grid. The magnitude of the impulse required to cut off the left-hand section depends upon the time which has elapsed after the left-hand section commenced conducting, and a larger negative pulse is required to trigger the left-hand section a short time after it commences conducting than would be required at some later time. Use is made of this fact in rendering the multivibrator relatively immune to triggering during an interval following a given triggering and of predetermined duration which, for the present application as hereinbefore mentioned, is equal to one half the delay produced in the supersonic delay line of the arrangement according to Fig. 1. Accordingly, triggering impulses from the output of detector 22 in the arrangement according to Fig. 1 are applied through connection 27 and coupling condenser 39 to the grid of amplitude selector and clipper tube 40 which may be a pentode. This tube is operated at low plate voltage so as to limit the amplitudes of pulses developed in its plate circuit to a value such that none of these pulses will be of sufficient amplitude to trigger the multivibrator during an interval following a given triggering and of duration equal to half the delay produced in supersonic delay line 15 of the arrangement of Fig. 1.

Moreover, in order that pulses shall appear in the output circuit of tube 40 only in response to pulses of greater than predetermined amplitude applied to its grid (i. e., triggering pulses from amplitude discriminator 28 of Fig. 1) tube 40 is grid-leak biased with a time constant equal to several times the desired pulse repetition frequency (i. e., several times the effective length of delay line 15 in the arrangement according to Fig. 1). This is accomplished by an appropriate selection of the values of condenser 39 and grid leak resistor 42. The selection of the time constant in this manner will effectively prevent signals smaller than the triggering pulses from driving tube 40 into strong conduction, but at the same time will permit the tube to follow reasonable variations in the magnitudes of synchronizing pulses, despite the variations in the tube characteristics produced by aging. It will be noted that tube 40 also performs the function of amplitude discriminator 28 of Fig. 1. Further discrimination against signals smaller than normal triggering pulses is obtained by operating tube 40 at low screen voltage, whereby the sharpness of cut off is enhanced.

Triggering pulses developed across resistor 41 in the plate circuit of tube 40 are preferably differentiated through the action of a suitable RC circuit comprising condenser 43 and resistor 44 to produce sharp negative triggering pulses which are supplied through coupling condenser 45 to the grid of the left-hand section of multivibrator tube 30.

Since the characteristics of the multivibrator will tend to vary, depending upon the load to which its output is supplied, it will be desirable, in order to achieve the ends as herein set forth, to provide an isolator stage through which the output of the multivibrator may be supplied, for example, to transmitter 4 and signal combiner 11 in the arrangement according to Fig. 1 without substantially modifying the characteristics of the multivibrator. Accordingly, in Fig. 2, the multivibrator output is derived from the plate of the left-hand section of tube 30 and is supplied through coupling condenser 46 to the grid of a pentode isolator tube 47. This tube is provided with a large grid-leak resistor 51 and a relatively small cathode load resistor 52 so that it operates to limit, by grid conduction, the magnitudes of pulses appearing in its plate circuit. The latter may be supplied through separate connections 3 and 10 to transmitter 4 and signal combiner 11 respectively in the arrangement according to Fig. 1.

Typical values of the circuit components of the pulse repetition frequency oscillator as just described, for use in a system according to Fig. 1, having the parameters hereinbefore specified, are listed below for purely illustrative purposes and with no intention thereby to limit the scope of the invention:

| | |
|---|---|
| Resistor 31 | 2,700 ohms. |
| Resistor 32 | 19 megohms. |
| Resistor 33 | 5.6 megohms. |
| Condenser 34 | 3,900 mmfd. |
| Condenser 35 | 10 mmfd. |
| Resistor 36 | 56,000 ohms. |
| Resistor 37 | 10,000 ohms. |
| Resistor 38 | 560,000 ohms. |
| Condenser 39 | 6,800 mmfd. |
| Resistor 41 | 100,000 ohms. |
| Resistor 42 | 1.5 megohms. |
| Condenser 43 | 10 mmfd. |
| Resistor 44 | 33,000 ohms. |
| Condenser 45 | 47 mmfd. |
| Condenser 46 | 6,800 mmfd. |
| Resistor 48 | 100,000 ohms. |
| Resistor 49 | 15,000 ohms. |
| Resistor 50 | 10,000 ohms. |
| Resistor 51 | 2.2 megohms. |
| Resistor 52 | 220 ohms. |
| Resistor 53 | 4,700 ohms. |

Tube 40 may be a commercial type 6AU6 operated with its plate approximately 13 volts positive with respect to its cathode and with 20 volts applied to its screen grid. Tube 30 may be a commercial type 6J6 and tube 47 may be a commercial type 6AK5.

I claim:

1. In combination, means responsive to triggering impulses for generating pulse signals timed with reference to said triggering impulses, said means being susceptible of being triggered by triggering impulses of progressively smaller magnitude at times progressively increasingly delayed after a given triggering and being incapable of being triggered during an interval of predetermined duration following a given triggering by triggering impulses of less than a predetermined magnitude, means responsive to said generated pulses for producing other signals, means for combining said generated pulses with said other signals, delay means having an input circuit and an output circuit and adapted to delay by a predetermined amount signals applied to said input circuit, means for applying said combined signals and generated pulses to the input circuit of said delay means, means for deriving from said output circuit delayed versions of said combined signals and generated pulses, means for separating said generated pulses from said other signals in said delayed output, means for limiting said separated pulses to magnitudes not exceeding said predetermined magnitude, and means for applying said limited pulses as triggering impulses to said pulse generating means, whereby said pulse generating means is caused to generate pulses whose spacing is substantially equal to the delay of said separated output signals with reference to said signals produced in response to said generated pulses.

2. In combination, means responsive to triggering impulses for generating pulse signals timed with reference to said triggering impulses, said means being non-responsive to triggering impulses during an interval of predetermined duration following each triggering, means responsive to said generated pulses for producing other signals, means for combining said generated pulses with said other signals, delay means having an input circuit and an output circuit and adapted to delay signals applied to its input circuit by a predetermined amount less than twice the duration of the interval during which said pulse generating means is unresponsive to triggering impulses, means for applying said combined signals and generated pulses to the input circuit of said delay means, means for deriving from said output circuit delayed versions of said combined signals and generated pulses, means for separating said generated pulses from said other signals in said delayed output, and means for applying said separated pulses as triggering impulses to said pulse generating means, whereby said pulse generating means is caused to generate pulses whose spacing is substantially equal to the delay of said separated output signals with reference to said signals produced in response to said generated pulses.

3. In combination, means responsive to triggering impulses for generating pulse signals, said means being susceptible of being triggered by triggering impulses of progressively smaller magnitude at times progressively increasingly delayed after a given triggering and being incapable of being triggered during an interval of predetermined duration following a given triggering by triggering impulses of less than a predetermined magnitude, means for delaying pulse signals generated by said first-named means by a second predetermined time interval in excess of said first-named interval, means for limiting said delayed pulse signals to magnitudes not exceeding said predetermined magnitude, and means for applying said limited pulse signals to trigger said pulse generating means.

4. A combination according to claim 3 in which said means for delaying pulse signals generated by said first-named means is operative to delay said pulse signals by a time interval not exceeding twice the duration of said first-named interval.

ALLEN C. MUNSTER.

References Cited in the file of this patent

UNITED STATES PATENTS

| Number | Name | Date |
| --- | --- | --- |
| 2,212,173 | Wheeler et al. | Aug. 20, 1940 |
| 2,255,403 | Wheeler | Sept. 9, 1941 |
| 2,422,382 | Winchel | June 17, 1947 |
| 2,480,038 | Mason | Aug. 23, 1949 |
| 2,491,450 | Holmes | Dec. 13, 1949 |
| 2,523,283 | Dickson | Sept. 26, 1950 |
| 2,532,546 | Forbes | Dec. 5, 1950 |

FOREIGN PATENTS

| Number | Country | Date |
| --- | --- | --- |
| 813,404 | France | Feb. 22, 1937 |
| 552,072 | Great Britain | Mar. 22, 1943 |